United States Patent
Liang

(10) Patent No.: US 8,284,174 B2
(45) Date of Patent: Oct. 9, 2012

(54) STYLUS

(75) Inventor: Shi-Xu Liang, Shenzhen (CN)

(73) Assignees: Shenzhen Futahong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 355 days.

(21) Appl. No.: 12/819,292

(22) Filed: Jun. 21, 2010

(65) Prior Publication Data

US 2011/0181554 A1    Jul. 28, 2011

(51) Int. Cl.
*G06F 3/033* (2006.01)

(52) U.S. Cl. ......................................... 345/179; 345/180

(58) Field of Classification Search ........................ None
See application file for complete search history.

(56) References Cited

U.S. PATENT DOCUMENTS

2007/0024601 A1* 2/2007 Liu et al. ........................ 345/179

* cited by examiner

*Primary Examiner* — Muhammad N Edun
(74) *Attorney, Agent, or Firm* — Altis Law Group, Inc.

(57) ABSTRACT

A stylus comprises a housing, a stylus body and a sliding enabling member. The slide enabling member slideably coupling the stylus body to the housing so the stylus body can slide relative to the housing from a retracted configuration to an extending configuration. The slide enabling member includes a sliding pin and two tracks engaging the sliding pin, the sliding pin is positioned on a sliding element located in the receptacle of the housing, and the tracks are two guiding grooves defined in a guiding element located in the chamber of the stylus body, the sliding pin slides in the tracks when the stylus body slides relative to the housing between the retracted configuration and the extended configuration.

20 Claims, 7 Drawing Sheets

STYLUS

BACKGROUND

1. Technical Field

This exemplary disclosure generally relates to writing implements, and particularly to retractable/extendable styluses.

2. Description of Related Art

It is well-known that a variety of devices include a touch screen. Examples of such devices include smart phones, personal digital assistants (PDA), pagers, personal organizers, and the like. These devices typically include a display module under the touch screen. The display module generates target images associated with menu options, programs, user choices, and other operations. The user controls the device by pressing the touch screen over the target image with a stylus. However, typical styluses can be inconvenient to retract or extend.

Therefore, there is room for improvement within the art

BRIEF DESCRIPTION OF THE DRAWINGS

Many aspects of the exemplary stylus can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

DETAILED DESCRIPTION

In this exemplary embodiment, the stylus is used to contact a touch screen display of an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, stylus body-based or keyboard-based handheld devices, remote control units, portable media players (such as an MP3 or DVD player) that have wireless communication capability and the like. Accordingly, any reference herein to the mobile telephone should also be considered to apply equally to other portable wireless electronic devices.

Figure 1:
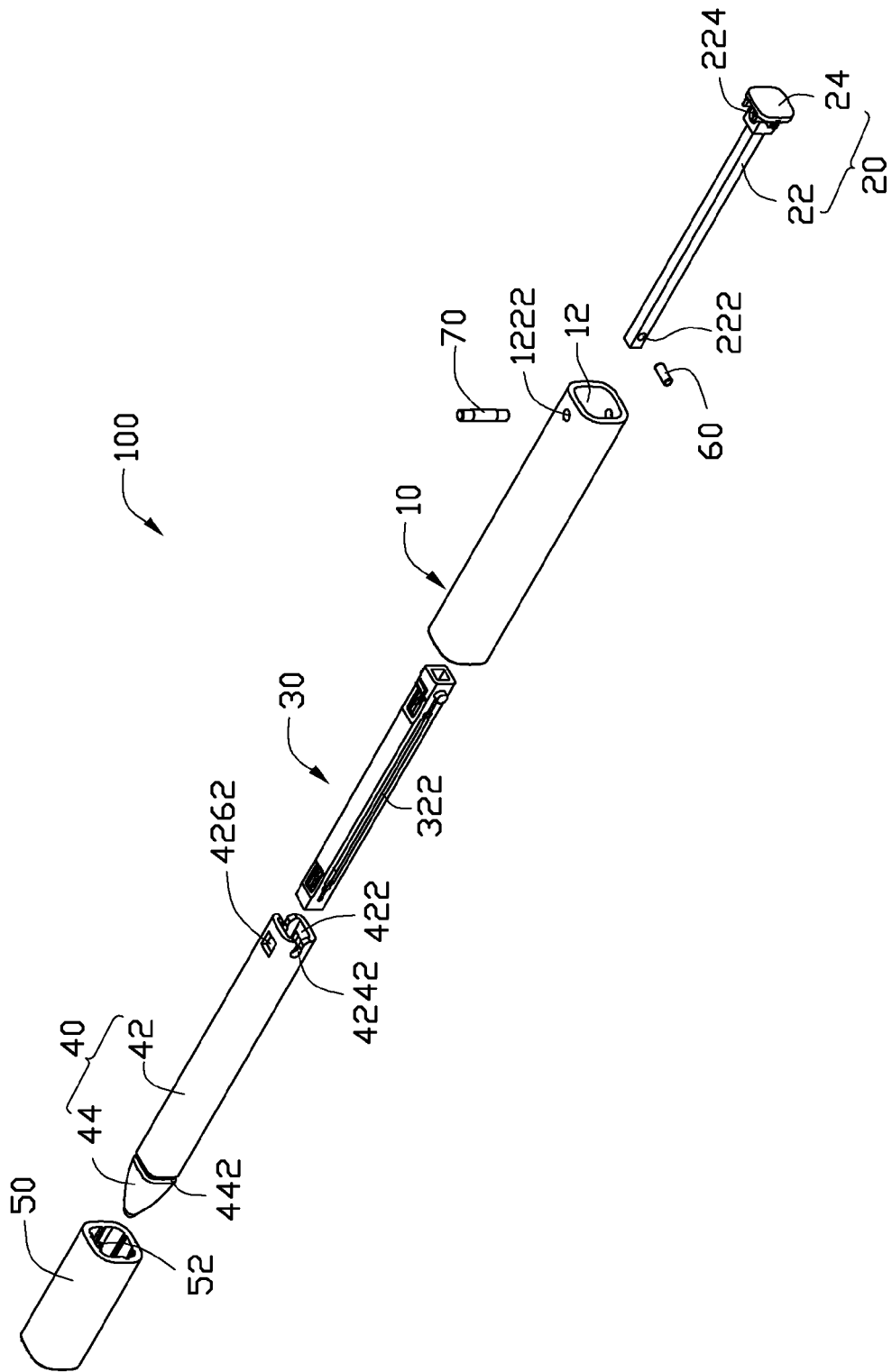
FIG. 1 is an exploded view of an exemplary stylus.
Figure 3:
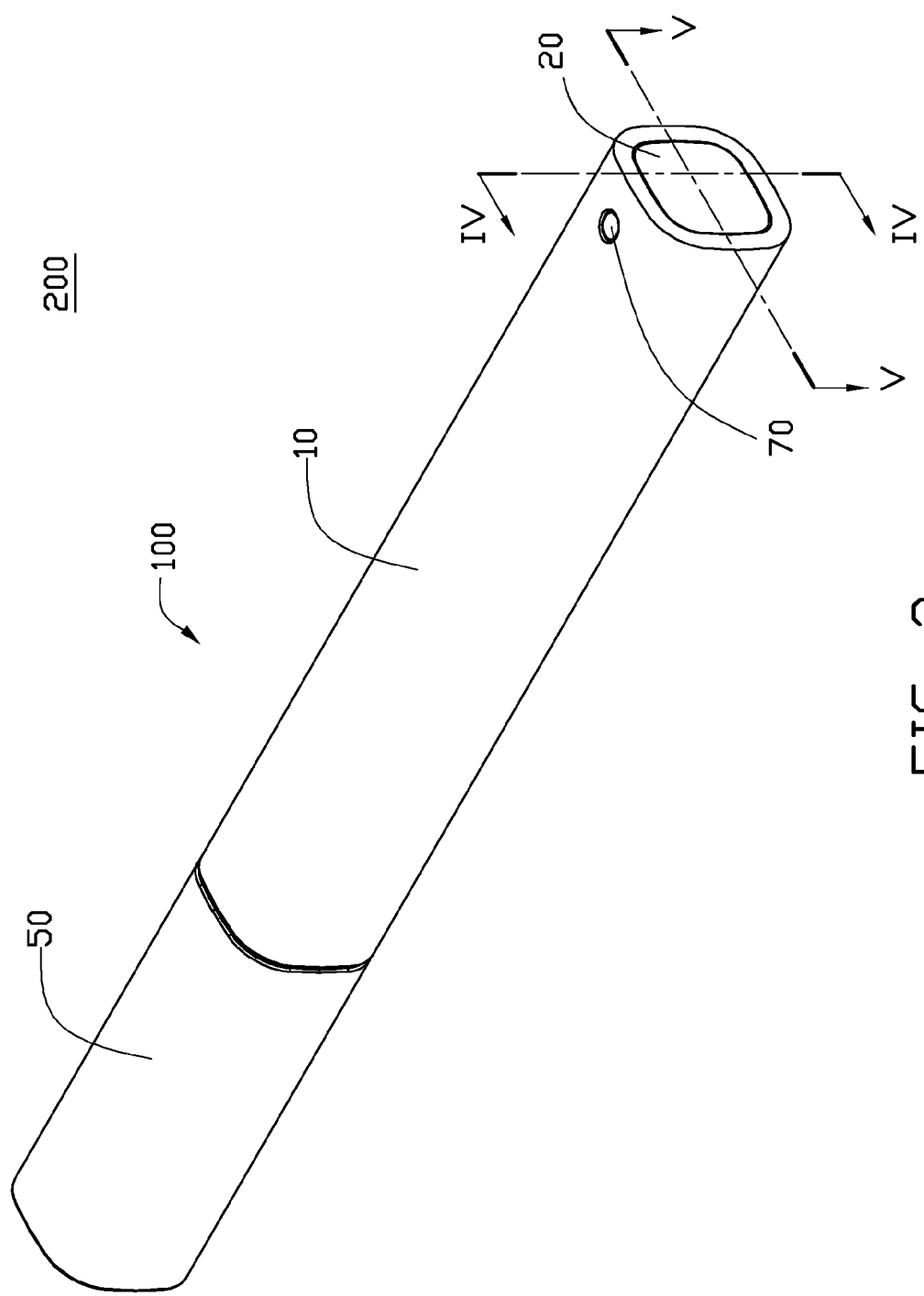
FIG. 3 is an assembled view of the stylus shown in FIG. 1.
Figure 4:
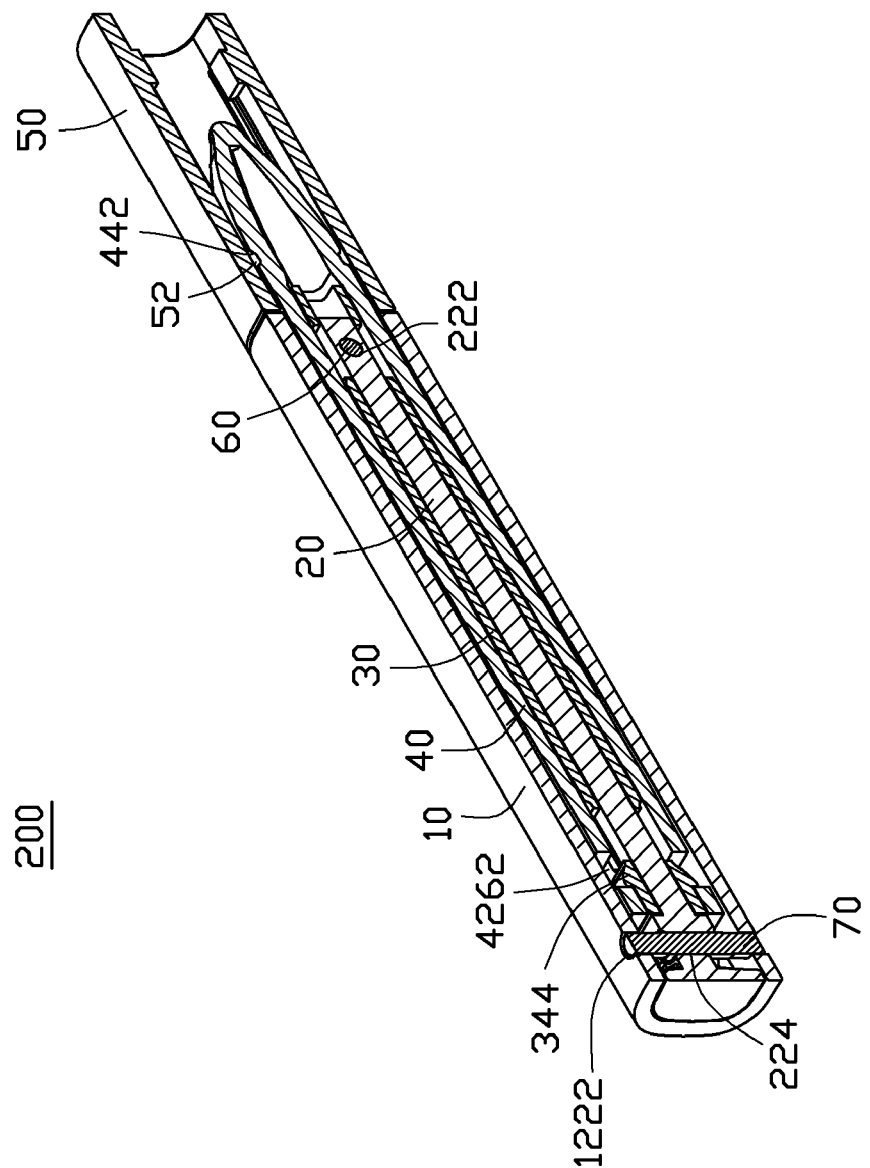
FIG. 4 is a cross-sectional view of the stylus in FIG. 3 along the line IV-IV, and wherein the stylus is in a close position.

Referring to FIGS. 1 and 4, a stylus 100 includes a housing 10, a stylus body 40 and a cap 50. The stylus body 40 is retractably accommodated in the housing 10 by a slide enabling member (not labeled), and the cap 50 covers the head of the stylus body 40 for protecting it. In a retracted or closed configuration 200 shown in FIGS. 3-5, the stylus body 40 is retracted in the housing 10 so the stylus 100 is shortened to improve the portability of the stylus 100. In an extended configuration 300 shown in FIGS. 6-7, the stylus body 40 is extended out of the housing 10 so the stylus 100 is lengthened to improve the convenience of using the stylus 100.

The housing 10 is tubular and of any suitable manufacture, and may for example be constructed of a light weight metal such as stainless steel or aluminum alloy. The housing 10 is hollow, having a receptacle 12 defined longitudinally therethrough.

The stylus body 40 be of any suitable manufacture, and may for example be constructed of a lightweight metal such as stainless steel or aluminum alloy. The stylus body 40 is received within the receptacle 12 of the housing 10 and partially extends out of the housing 10. The stylus body 40, in this exemplary embodiment, may include a main body 42 and a head 44 protruding from one end of the main body 42. The main body 42 has generally the same shape as, but is slightly smaller than, the receptacle 12 of the housing 10, so the main body 42 can be slidably fitted within the receptacle 12 of the housing 10. The stylus body 40 is hollow, having a chamber 422 defined longitudinally therethrough.

The stylus body 40 further includes a retaining slot 442 defined at an outer surface thereof between the main body 42 and the head 44. The cap 50 includes a protrusion 52 protruding from an inner surface thereof. The protrusion 52 corresponds to the retaining slot 442. The protrusion 52 rests in the retaining slot 442 when the cap 32 is covering the head 44, as shown in FIG. 4, firmly be helding the cap 32 on the head 44 to protect the head 44.

Figure 5:
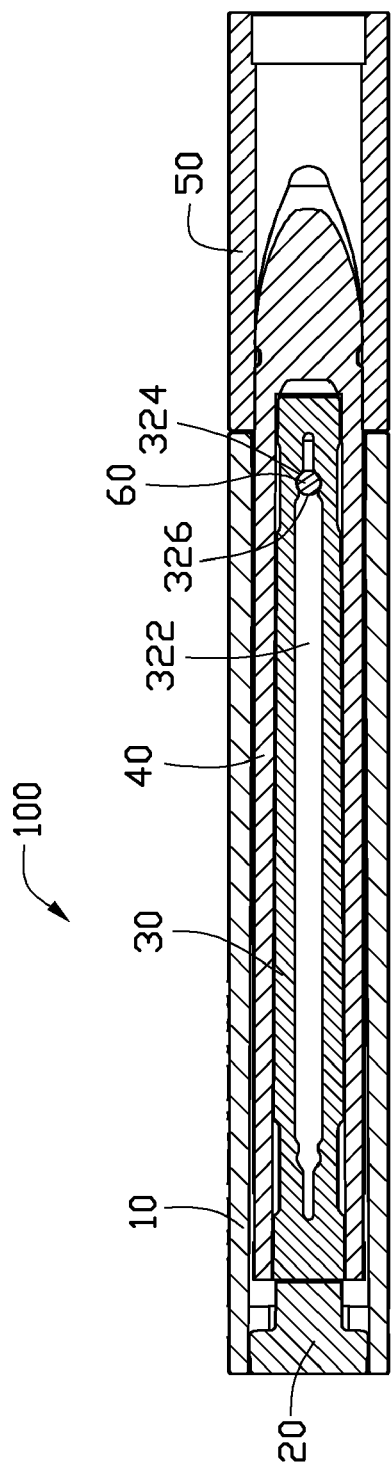
FIG. 5 is a cross-sectional view of the stylus in FIG. 3 along the line V-V.

Referring to FIGS. 1, 4 and 5, the slide enabling member allows the stylus body 40 to slidably engage the housing 10 from a closed/retracted position 200 to an extended position 300. The slide enabling member, in this exemplary embodiment, may include a sliding pin 60 and two tracks 322 engaging the sliding pin 60. The sliding pin 60 is positioned on a sliding element 20 <use active language—see throughout> located in the receptacle 12 of the housing 10, and the tracks 322 are two guiding grooves defined in a guiding element 30 located in the chamber 422 of the stylus body 40. The sliding pin 60 slides in the tracks 322 when the stylus body 40 slides relative to the housing 10 between the retracted configuration 200 and the extended configuration 300.

The sliding element 20 includes a retaining portion 24 and a sliding portion 22 extending from one end of the retaining portion 24. The retaining portion 24 is retained on the housing 10 in such a way that the retaining portion 24 has a retaining hole 224 defined therethrough, the housing 10 has two holes 1222, and a retaining pin 70 is tightly fitted in the retaining hole 224 and the holes 1222. Therefore, >the sliding element 20 is retained on the housing 10. The sliding portion 22 has a hollow 222 defined in a distal end thereof opposite to the retaining portion 24, the sliding pin 60 is tightly fitted in the hollow 222 so the sliding pin 60 is mounted on the sliding portion 22.

Figure 2:
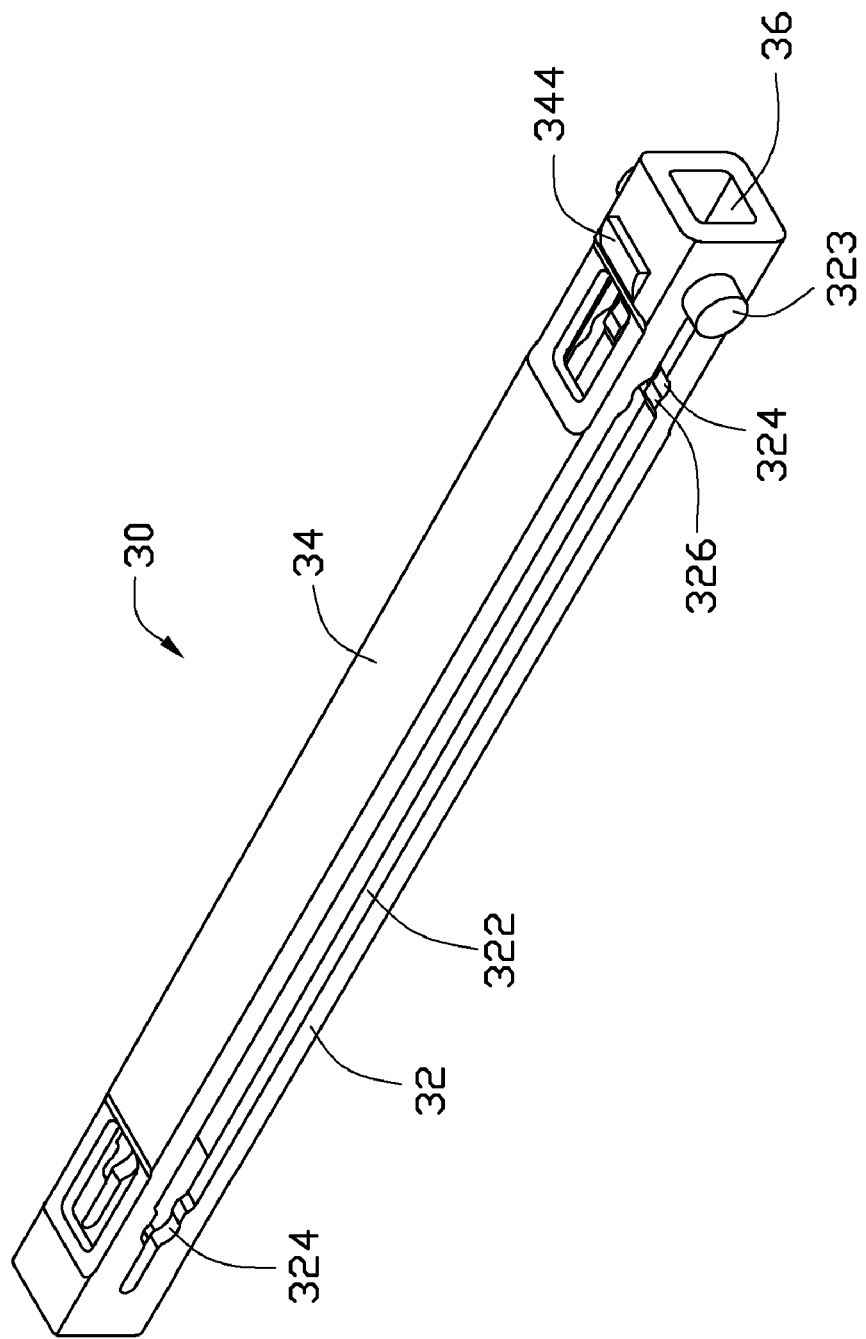
FIG. 2 is an enlarged view of a guiding element of the exemplary stylus shown in FIG. 1.

Referring to FIG. 2, the guiding element 30 has a cavity 36 defined therein. When the stylus body 40 slides relative to the housing 10 between the retracted configuration 200 and the extended configuration 300, the sliding portion 22 of the sliding element 20 slides in the cavity 36. The guiding element 30 includes opposite first sidewalls 32 and opposite second sidewalls 34. The tracks 322 are respectively defined through the first sidewalls 32.

Each opposite end of each track 322 further has a stopping hole 324 respectively defined therein and communicating with corresponding track 322. The stopping holes 324 are configured to hold the stylus body 40 in the retracted position 200 or the extended position 300. Each stopping hole 324 communicates with corresponding track 322 by a slit 326 located between the stopping holes 324 and corresponding track 322. The stopping holes 324 are sized and dimensioned to tightly fit the sliding pin 60 therein when the stylus body 40 slides to the retracted position 200 shown in FIG. 5 and/or the extended position 300 shown in FIG. 7. The slits 346 are smaller than the sliding pin 60 so the sliding pin 60 can not freely slide out of the stopping holes 324 when the sliding pin 60 is fitted in the stopping holes 324. Thus, the stylus body 40 can be firmly held in the retracted position 200 and the extended position 300 by the tight fit engagement between the stopping holes 324 and the sliding pin 60.

A first retaining structure is illustrated in FIGS. 1, 2 and 4. The first retaining structure i retain the guiding element 30 in the chamber 422 of the stylus body 40. The first retaining structure, in this exemplary embodiment, may include a set of retaining members 344 and a set of retaining slots 4262 engaging the retaining members 344. The retaining members 344 may be two raised portions respectively positioned in the second sidewalls 34 of the guiding element 30 and the retaining slots 4262 are defined through opposite surfaces in the chamber 422 of the stylus body 40. The retaining members 344 are latched in the retaining slots 4262 to latch the guiding element 30 in the chamber 422 of the stylus body 40. It is understood that one of ordinary skill in the art would appreciate the first retaining structure that comprises the retaining members 344 and the retaining slots 4262 are only one example. It is also understood that the retaining members 344 may be carried on either the stylus body 40 or the housing 10 and the retaining member engaging members (e.g. retaining slots 4262) may be carried on the element that the retaining members 344 are not carried on.

A second retaining structure is illustrated in FIGS. 1 and 2. The second retaining structure assists the guiding element 30 to be held in the chamber 422 of the stylus body 40. The second retaining structure, in this embodiment, may includes a set of posts 323 and a set of latching holes 4242 engaging the posts 323. The posts 323 are respectively positioned on the first sidewalls 32 of the guiding element 30 and the latching holes 4242 are defined in opposite surfaces in the chamber 422 of the stylus body 40. The posts 323 are latched in the retaining slots 4262 to assist the guiding element 30 to be held in the chamber 422 of the stylus body 40.

Referring to FIGS. 1, 3-5, to assemble the stylus 100, the sliding element 20 is first inserted in the cavity 36 of the guiding element 30, the hollow 222 of the sliding element 20 is aligned with the tracks 322 of the guiding element 30. The sliding pin 60 is then inserted into the tracks 322 and the hollow 222, and the sliding pin 60 is tightly fitted in the hollow 222 so the sliding pin 60 is retained on the sliding element 20. The sliding element 20 is inserted into the receptacle 12 of the housing 10 and the retaining hole 224 is aligned with the orifice of the housing 10. The retaining pin 70 is then inserted into the holes 1222 and the retaining hole 224, and the retaining pin 70 is tightly fitted in the retaining hole 224 and the holes 1222 so the sliding element 20 is mounted to the housing 10. The guiding element 30 is then inserted into the chamber 422 of the stylus body 40 until the retaining members 344 are retained in the retaining slots 4262 and the posts 323 are latched in the latching holes 4242, thereby mounting the guiding element 30 to the stylus body 40. Finally, the cap 50 is placed over the head 44 of the stylus body 40 with the protrusion 52 accommodated in the retaining slot 442, to complete assembly of the stylus 100.

Figure 6:
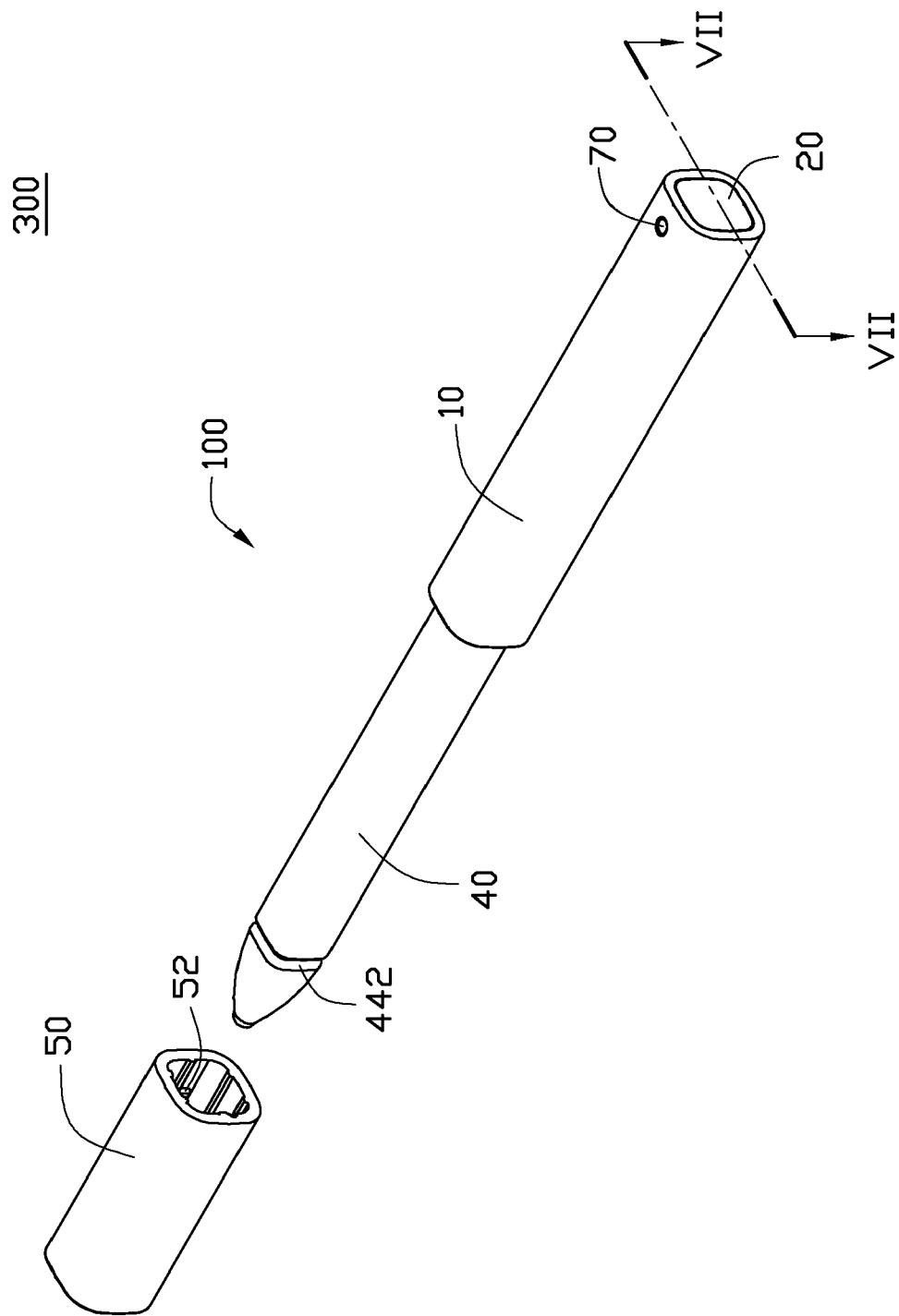
FIG. 6 is similar to FIG. 3, but showing the stylus in an open position and a cap is removed.
Figure 7:
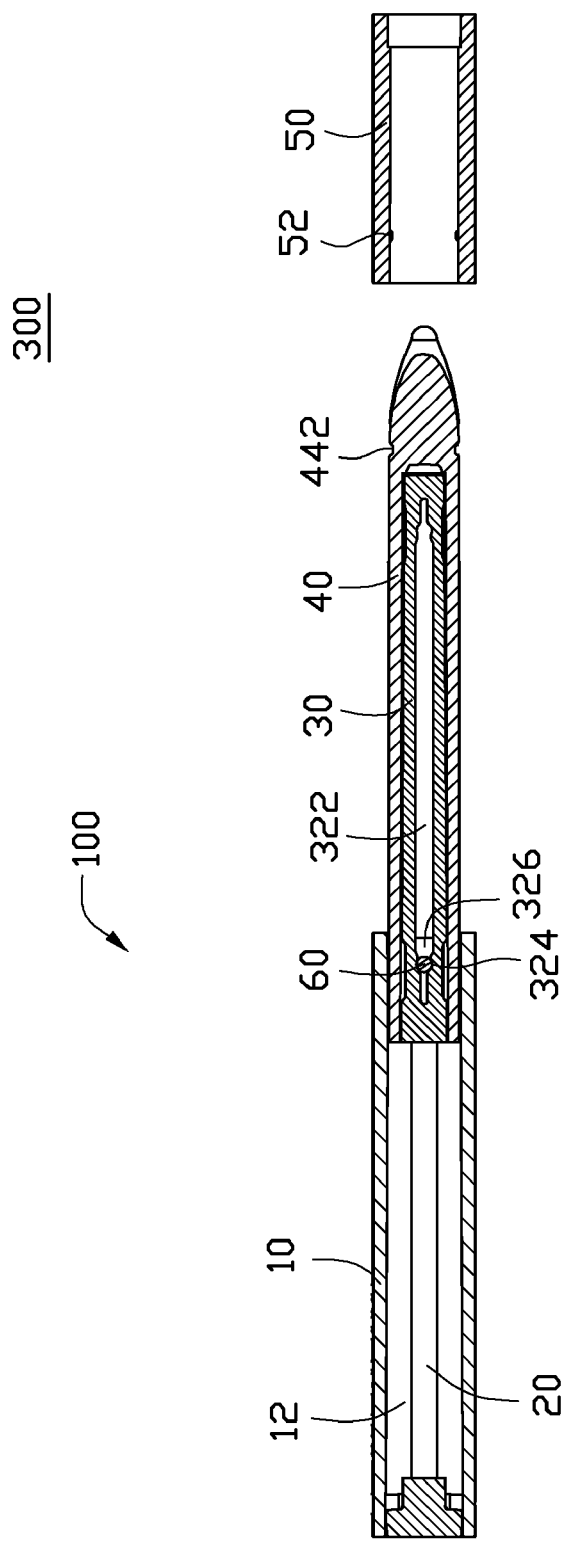
FIG. 7 is a cross-sectional view of the stylus in FIG. 6 along the line VII-VII.

Referring to FIGS. 5 to 7, in operation, the cap 50 is pulled away from the housing 10 until the protrusion 52 of the cap 50 are slid out of the retaining slot 442 of the stylus body 40. The head of the stylus body 40 is then pulled away from the housing 10 until the sliding pin 60 slides out of the stopping hole 324. The sliding pin 60 is then slid in the tracks 322 of the guiding element 30 toward the other stopping hole 324. Once the sliding pin 60 is positioned in the other stopping hole 324, the stylus 100 is positioned in the extended position 300 shown in FIG. 7 so the stylus 100 is ready to use.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A stylus, comprising:
a housing having a receptacle defined therethrough;
a stylus body slidably accommodated in the receptacle of the housing, the stylus body defining a chamber therethrough; and
a slide enabling member slidably coupling the stylus body to the housing so the stylus body can slide relative to the housing from a retracted configuration to an extending configuration;
wherein the slide enabling member includes a sliding pin and two tracks engaging the sliding pin, the sliding pin positioned on a sliding element located in the receptacle of the housing, and the tracks are two guiding grooves defined in a guiding element located in the chamber of the stylus body, the sliding pin slides in the tracks when the stylus body slides relative to the housing between the retracted configuration and the extended configuration.

2. The stylus as claimed in claim 1, wherein the sliding element includes a retaining portion and a sliding portion extending from one end of the retaining portion; the retaining portion retained on the housing, the sliding portion has a hollow defined in a distal end thereof opposite to the retaining portion, the sliding pin is tightly fitted in the hollow.

3. The stylus as claimed in claim 2, wherein the retaining portion has a retaining hole defined therethrough, the housing has two holes, and a retaining pin is tightly fitted in the retaining hole and the holes to retain the sliding element on the housing.

4. The stylus as claimed in claim 2, wherein the guiding element has a cavity defined therein; when the stylus body slides relative to the housing between the retracted configuration and the extended configuration, the sliding portion of the sliding element slides in the cavity.

5. The stylus as claimed in claim 4, wherein the guiding element includes two opposite first sidewalls, the tracks are respectively defined through the first sidewalls.

6. The stylus as claimed in claim 1, wherein the stylus further includes a first retaining structure which i retains the guiding element in the chamber of the stylus body.

7. The stylus as claimed in claim 6, wherein the first retaining structure includes a set of retaining members and a set of retaining slots engaging the retaining members.

8. The stylus as claimed in claim 7, wherein the retaining members are respectively positioned in the guiding element and the retaining slots are defined through the stylus body.

9. The stylus as claimed in claim 1, wherein the stylus further includes a second retaining structure assisting the guiding element to be held in the chamber of the stylus body.

10. The stylus as claimed in claim 9, wherein the second retaining structure includes a set of posts and a set of latching holes engaging the posts.

11. The stylus as claimed in claim 10, wherein the posts are respectively positioned on the guiding element and the latching holes are defined in the stylus body.

12. A stylus, comprising:
a housing having a receptacle defined therethrough;
a stylus body slidably accommodated in the receptacle of the housing, the stylus body defining a chamber therethrough; and
a sliding element retained in the receptacle of the housing;
a guiding element retained in the chamber of the stylus body and defining two tracks therethrough along a sliding direction of the stylus body;
a sliding pin fixed on the sliding element and slidably engaging with the two tracks so the stylus body along with the guiding element slide relative to the housing and extend out of the housing.

13. The stylus as claimed in claim 12, wherein the sliding element includes a retaining portion and a sliding portion extending from one end of the retaining portion; the retaining portion is retained on the housing, the sliding portion has a hollow defined in a distal end thereof opposite to the retaining portion, the sliding pin is tightly fitted in the hollow.

14. The stylus as claimed in claim 13, wherein the retaining portion has a retaining hole defined therethrough, the housing has two holes, and a retaining pin is tightly fitted in the retaining hole and the holes to retain the sliding element on the housing.

15. The stylus as claimed in claim 13, wherein the guiding element has a cavity defined therein; when the stylus body slides relative to the housing between the retracted configuration and the extended configuration, the sliding portion of the sliding element slides in the cavity.

16. A stylus, comprising:
a housing having a receptacle defined therethrough;
a stylus body slidably accommodated in the receptacle of the housing, the stylus body defining a chamber therethrough; and
a guiding element retained in the chamber of the stylus body and defining two tracks therethrough along a sliding direction of the stylus body;
a sliding pin fixed relative to the housing and slidably engaging with the two tracks so the stylus body, together with the guiding element, slides relative to the housing and extends out of the housing.

17. The stylus as claimed in claim 16, wherein the sliding element includes a retaining portion and a sliding portion extending from one end of the retaining portion; the retaining portion is retained on the housing, the sliding portion has a hollow defined in a distal end thereof opposite to the retaining portion, the sliding pin is tightly fitted in the hollow.

18. The stylus as claimed in claim 17, wherein the retaining portion has a retaining hole defined therethrough, the housing has two holes, and a retaining pin is tightly fitted in the retaining hole and the holes to retain the sliding element on the housing.

19. The stylus as claimed in claim 17, wherein the guiding element has a cavity defined therein; when the stylus body slides relative to the housing between the retracted configuration and the extended configuration, the sliding portion of the sliding element slides in the cavity.

20. The stylus as claimed in claim 19, wherein the guiding element includes two opposite first sidewalls, the tracks are respectively defined through the first sidewalls.

* * * * *

UNITED STATES PATENT AND TRADEMARK OFFICE
CERTIFICATE OF CORRECTION

| | | |
|---|---|---|
| PATENT NO. | : 8,284,174 B2 | Page 1 of 1 |
| APPLICATION NO. | : 12/819292 | |
| DATED | : October 9, 2012 | |
| INVENTOR(S) | : Shi-Xu Liang | |

It is certified that error appears in the above-identified patent and that said Letters Patent is hereby corrected as shown below:

On the Title Page

Please replace (30) regarding "Foreign Application Priority Data" with the following:

(30)    Foreign Application Priority Data

Jan. 23, 2010  (CN) ........................201010300631.7

Signed and Sealed this
Eighteenth Day of November, 2014

Michelle K. Lee
*Deputy Director of the United States Patent and Trademark Office*